Inventor:-
William D. Colianni,
By Geist, Lockwood, Greenawalt & Dewey
Attys.

United States Patent Office 3,558,381
Patented Jan. 26, 1971

3,558,381
METHOD OF MAKING BUTTONHOLES
William D. Colianni, 4179 W. Barry Ave.,
Chicago, Ill. 60641
Filed May 18, 1967, Ser. No. 639,350
Int. Cl. A41h *25/00*
U.S. Cl. 156—73                4 Claims

ABSTRACT OF THE DISCLOSURE

Buttonholes are formed in synthetic textile material, either pure or blended with natural filaments, by using ultrasonic energy to fuse or bond the textile material in areas where buttonholes are to be located and then slitting these elongated areas either after or during ultrasonic bonding. If multiple thicknesses of material are involved, they will be fused or bonded together when subjected to ultrasonic energy.

---

Many garments and articles are formed from fabrics containing synthetic fibers or filaments in which buttonholes are required such for example as, men's shirts, women's blouses, and a variety of outer garments such as jackets, sweaters, windbreakers and raincoats. The formation of buttonholes in such garments and articles has required substantial labor costs even when sewing machines are used which are equipped with modern buttonhole forming attachments. In such attachments, the buttonholes are formed by closely stitching the material in the area of the buttonhole in well-known manner and then slicing or cutting through longitudinally the area leaving the buttonhole with the edges formed by the close stitching.

In addition to the objectionable labor costs involved, the formation of buttonholes by the conventional technique involves the problem of matching the color of the thread used to that of the material. Furthermore, the thread may bleed and stain the garment on laundering.

It is known that two or more thicknesses of synthetic textiles or fabrics may be permanently bonded or sealed together by application thereto of ultrasonic energy. This means of bonding or sealing has previously been used to form so-called "threadless stitches" in such materials. In accordance with the present invention, I propose to utilize a modification of the threadless stitching technique in forming buttonholes in synthetic fabrics in a very inexpensive manner.

In accordance with the present invention, if the buttonholes are to be formed in multiple thickness of a material, the two or more thicknesses of synthetic textile materials are held together in the elongated areas in which it is desired to form the buttonholes. Ultrasonic energy is then applied to seal the thicknesses together and also bond or fuse the fibers in each ply or thickness in the area. The buttonhole is completed by slitting the sealed area. The slitting may be performed after the area has been sealed or it may be performed while the thicknesses are held together in the area and either before or during the actual application of ultrasonic energy, depending upon the particular ultrasonic sealing apparatus that is available. Any desired number of buttonholes may be similarly formed either sequentially or simultaneously depending upon the apparatus available.

The object of the present invention, generally stated, is the method of inexpensively forming buttonholes in fabric or textile material containing a substantial content of synthetic fibers or filaments by fusing or bonding the material in the area or areas where a buttonhole or buttonholes are desired by application thereto of ultrasonic energy and slitting the area before, during or after the same has been ultrasonically sealed or bonded.

For a more complete understanding of the nature and scope of the invention, reference may now be had to the following description thereof taken in conjunction with the accompanying drawing, wherein.

Figure 1:
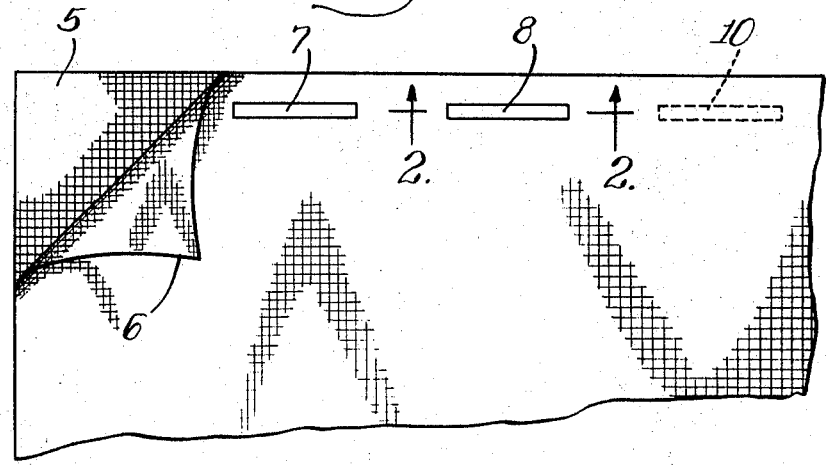
FIG. 1 is a plan view showing two thicknesses of synthetic textile material or fabric in which two buttonhole areas have been ultrasonically bonded together and in which a third un-bonded buttonhole area is indicated in broken outline.

Apparatus is known and available for using ultrasonic energy to continuously bond or seal two or more thicknesses of synthetic fabric material along a continuous line which may be either straight, angled or curved, as desired. For example, such apparatus is shown in the following patents: Deans 3,242,029; Tinsley et al. 3,294,616; and Bodine 3,022,814.

While the apparatus set forth in the foregoing patents may be utilized to ultrasonically seal or bond together thicknesses of synthetic textile material, along a continuous line, it is clear that by interrupting the application of ultrasonic energy, such as by interrupting the energization of the ultrasonic generators, the line of sealing or bonding instead of being continuous will be interrupted. For example, in the apparatus shown in Pat. 3,242,029, two thicknesses of synthetic textile material may be continuously fed between the knurled surface 37 of the driven anvil wheel 35 and the flat continuous surface 65 of the annular shoulder of the bell 64 actuated by the ultrasonic generator in the patent. While the energization of the motors 39 and 52 for driving or rotating the anvil 35 and the ultrasonic bell 64 may be continuous, the energization of the ultrasonic generator or transducer 40 may be intermittent and for predetermined periods. It will thus be seen that with the anvil 35 and cooperating bell 64 being driven at a predetermined speed, the length of the intermittent sealed areas and the spacing between the same may be readily obtained by simply varying the time that the ultrasonic generator or transducer 40 is energized and the times that it is unenergized.

Referring now to FIG. 1 of the accompanying drawings, two thicknesses of textile material 5 and 6 are indicated which may be formed entirely or partially for example from nylon, polyester, polyacrylate (Orlon), or polyethylene glycolterephthalate (Dacron) or other synthetic fibers. Blends of synthetic fibers may be used as well as blends of synthetic and natural fibers. Normally, the synthetic fiber content should be at least about 20%.

As shown on FIG. 1, the two thicknesses of textile material 5 and 6 have already been bonded together in two buttonhole areas indicated at 7 and 8 with a third buttonhole area not bonded together being indicated at 10 in broken outline. It will be understood that the plies or thicknesses 5 and 6 may be bonded together in the buttonhole areas 7, 8 and 10 etc. by running the thicknesses of material 5 and 6 through the apparatus shown and described in the Deans Pat. 3,242,029, for example, and by intermittently operating the ultrasonic generator.

Figure 2:
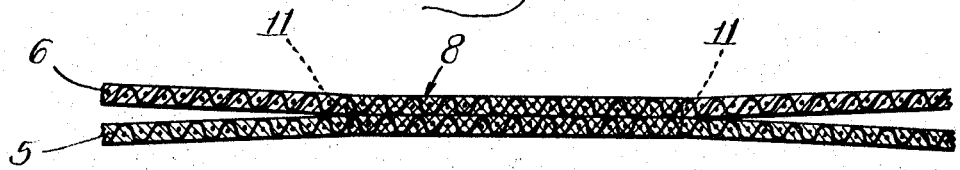
FIG. 2 is a sectional view on magnified scale taken through one sealed buttonhole area as indicated on line 2—2 of FIG. 1.

In FIG. 2, the buttonhole area is illustrated diagrammatically in magnified cross-section. It will be noted that the fibers are indicated as having been bonded together in the area between the broken lines indicated at 11—11. Beyond the margins of the bonded area 11 or of the buttonhole area 8, the plies are not bonded together but are unattached or separated as represented.

Figure 3:
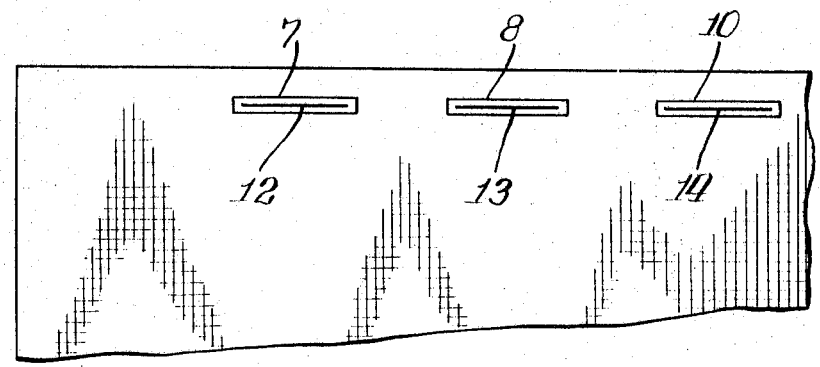
FIG. 3 is a plan view showing the completed buttonholes in the thicknesses of material shown in FIG. 1.

In FIG. 3 the completed buttonholes are indicated by 7, 8 and 10 after the same have been slitted as indicated at 12, 13 and 14, respectively. It will be appreciated that the slits may be formed in various manners such as manually or by machines. Preferably the slits will be formed by machine in the interest of automation and economy. For example, slitters are commercially available for forming slits of desired length and spacing in sheet material such as paper, plastic and films and these may be utilized for forming the slits 12, 13 and 14 after the buttonhole areas 7, 8 and 10 have been formed. Alternately, the slit forming means can be incorporated in the apparatus which is utilized for forming the ultrasonically sealed buttonhole areas 7, 8 and 10. For example, in the apparatus shown in Pat. 3,242,029 the knurled surface of the anvil wheel could be provided with knife receiving recesses which would be in registry with spaced knife projections formed on the continuous flat surface 65 of the bell 64.

It will be understood that my foregoing process may be followed in making buttonholes in a single thickness of material, for example, in a knitted sweater. In this use, the synthetic fibers or filaments in the buttonhole areas will be fused and bonded together so that no subsequent unravelling will occur.

I claim:

1. The method of forming buttonholes in textile fabric containing at least about 20% of synthetic fibers which form bonded closed buttonhole areas in said fabric on application of ultrasonic energy to said areas, which comprises, applying ultrasonic energy to said areas thereby bonding the synthetic fibers together therein, and forming a button receiving slit wholly within the confines of each of said closed buttonhole areas either before, during or after said application of ultrasonic energy thereto.

2. The method of claim 1 wherein a plurality of buttonholes are formed simultaneously in a predetermined pattern.

3. The method of claim 1 wherein a plurality of said buttonholes are formed sequentially.

4. The method of claim 1 wherein at least two superposed thicknesses of said textile fabric are bonded together in said buttonhole areas.

References Cited

UNITED STATES PATENTS

| | | | |
|---|---|---|---|
| 3,263,290 | 8/1966 | Eguchi | 2—266X |
| 3,296,990 | 1/1967 | Simjian | 156—73X |
| 3,308,003 | 3/1967 | Deans | 156—580 |
| 3,378,429 | 4/1968 | Obeda | 156—580X |
| 3,419,447 | 12/1968 | Hewitt | 156—251X |
| 3,500,509 | 3/1970 | Moden | 156—253 |

BENJAMIN R. PADGETT, Primary Examiner

B. H. HUNT, Assistant Examiner

U.S. Cl. X.R.

2—243, 266; 24—202; 156—251, 253, 515